United States Patent
Lindbeck

[19]

[11] Patent Number: 5,833,205
[45] Date of Patent: Nov. 10, 1998

[54] VIBRATOR MOUNTING ARRANGEMENT

[75] Inventor: Michael J. Lindbeck, Livonia, Mich.

[73] Assignee: Martin Engineering Company, Neponset, Ill.

[21] Appl. No.: 588,229

[22] Filed: Jan. 18, 1996

[51] Int. Cl.⁶ .................................................. F16M 1/00
[52] U.S. Cl. .......................... 248/674; 248/638; 248/647; 221/200; 222/196
[58] Field of Search .................................. 248/674, 638, 248/647, 223.4, 224.8, 224.7, 225.11, 222.15, 222.41, 222.51, 634, 580, 602, 632, 635, 612; 221/200, 201; 222/196, 198, 200

[56] References Cited

U.S. PATENT DOCUMENTS

| | | | |
|---|---|---|---|
| 3,003,733 | 10/1961 | Peterson | 248/224 |
| 3,078,015 | 2/1963 | Wahl | 222/200 |
| 3,420,480 | 1/1969 | Matson . | |
| 3,463,431 | 8/1969 | Matson | 248/674 |
| 3,637,115 | 1/1972 | Holm | 222/196 |
| 3,637,171 | 1/1972 | Kroeger | 248/14 |
| 3,826,356 | 7/1974 | Kroeger | 198/220 |
| 4,238,104 | 12/1980 | Hamilton | 248/566 |
| 4,516,766 | 5/1985 | Sutton, Jr. | 272/52 |
| 4,526,049 | 7/1985 | Pottgens | 74/87 |
| 4,715,533 | 12/1987 | Bucksbee et al. | 238/283 |
| 4,974,494 | 12/1990 | Kroger | 91/433 |
| 4,987,679 | 1/1991 | Rau | 29/897.2 |
| 4,996,907 | 3/1991 | Kroger | 91/433 |
| 5,054,251 | 10/1991 | Kemeny | 248/634 |
| 5,095,809 | 3/1992 | Kroger | 92/163 |
| 5,102,107 | 4/1992 | Simon et al. | 267/157 |
| 5,141,203 | 8/1992 | Baker et al. | 248/638 |
| 5,167,396 | 12/1992 | Burba et al. | 248/610 |
| 5,215,382 | 6/1993 | Kemeny | 384/36 |
| 5,242,147 | 9/1993 | Kemeny | 248/638 |
| 5,356,105 | 10/1994 | Andrews | 248/674 |

FOREIGN PATENT DOCUMENTS

| | | | |
|---|---|---|---|
| 59-62747 | 4/1984 | Japan | 248/638 |
| 3-195688 | 8/1991 | Japan | 248/638 |

Primary Examiner—Leslie A. Braun
Assistant Examiner—Kimberly Wood
Attorney, Agent, or Firm—Lee, Mann, Smith, McWilliams, Sweeney & Ohlson

[57] ABSTRACT

A mounting arrangement is provided for removably mounting a vibrator to a structure to be vibrated. The mounting arrangement includes a bracket, adapted to be attached to the vibrator, having a front surface and rear surface. A mounting sleeve formed from a resilient cushioning material includes a front face adapted to be associated with the front surface of the bracket and a rear face adapted to be associated with the rear surface of the bracket. The mounting sleeve is adapted to be coupled to the structure to be vibrated such that the mounting sleeve insulates the bracket from direct contact with the structure to reduce noise levels during operation of the vibrator, while the mounting sleeve effectively transmits vibrations from the bracket to the structure to be vibrated.

30 Claims, 3 Drawing Sheets

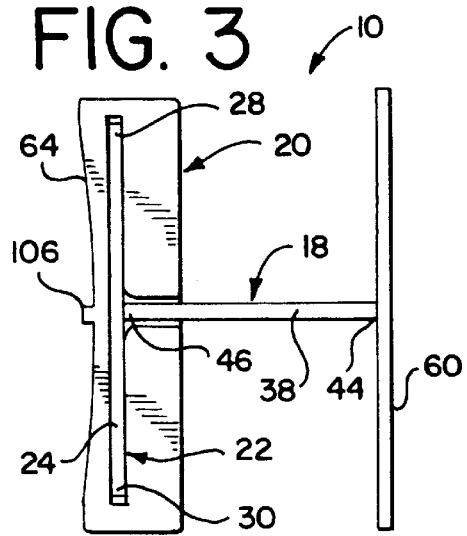
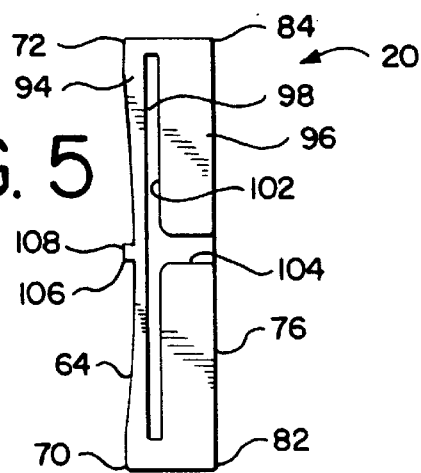
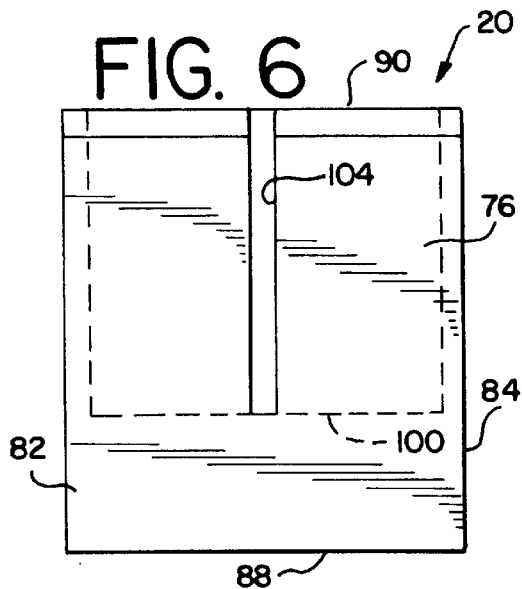
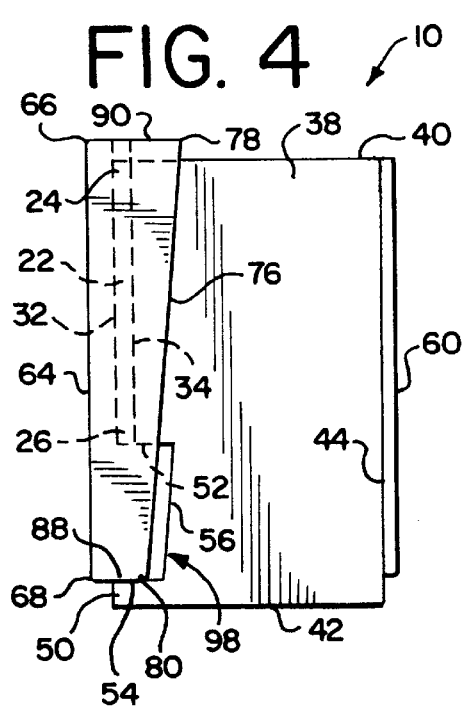
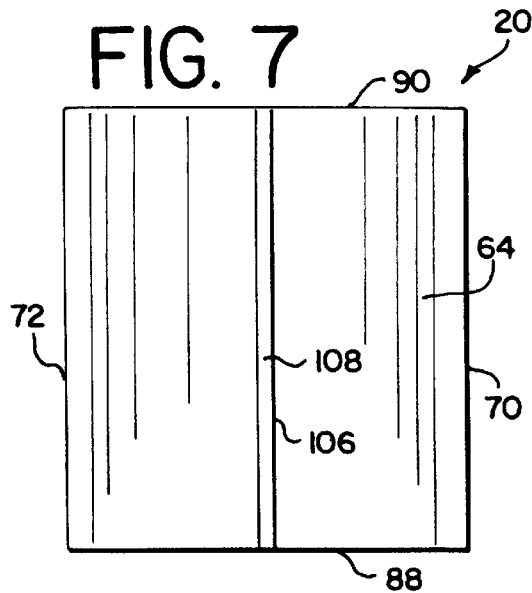

VIBRATOR MOUNTING ARRANGEMENT

BACKGROUND OF THE INVENTION

The present invention is directed to a mounting arrangement for removably mounting a vibrator to a structure to be vibrated, and in particular to a mounting arrangement which includes a bracket adapted for attachment to the vibrator and a wedge-shaped sleeve formed from a resilient material adapted to be coupled to the structure which insulates the vibrator and the mounting bracket from direct contact with the structure to reduce operating noise levels, while effectively transmitting vibrations from the vibrator to the structure.

Railroad cars and other storage structures often contain various types of bulk materials such as sand, gravel, coal and the like. Vibrators are often attached to these storage structures to thereby promote the flow of bulk material from the structure during unloading. Previously, vibrators have been removably attached to railroad cars with mounting brackets made from cast iron which weigh anywhere from thirty-one to fifty pounds. The metal mounting bracket was removably mounted to a railroad car by insertion within a generally C-shaped metal receptacle attached to the railroad car. The metal on metal contact between the mounting bracket and the receptacle causes the mounting bracket to rebound back and forth within the receptacle during operation of the vibrator. This rebound effect results in a loss of the amount of vibrational energy that is transferred from the vibrator to the rail car. Attempts to overcome the detrimental effects of rebounding have previously been made by attempting to secure the mounting bracket to the receptacle with screws or drift wedges. These attempts have been unsuccessful as the screws and wedges vibrate loose and otherwise inhibit the removal of the vibrator and mounting bracket from the receptacle when desired.

The act of inserting and removing a vibrator and mounting bracket from the receptacle of a rail car is difficult and goes against general lifting techniques. The footing normally found in unloading areas adjacent to railroad tracks is generally unstable and exposed to the elements thereby increasing the difficulty of attaching and removing a vibrator. In addition, the metal to metal contact of the mounting bracket against the rail car and the resulting rebound of the bracket creates high levels of noise during operation of the vibrator, posing a serious health risk to workers.

Resilient materials such as urethane have typically been used, as in automotive motor mounts, to connect two parts together when it is desired to reduce or inhibit vibrations from being transferred from one part to the other. The present invention, however, combines elements completely contrary to these teachings and utilizes a resilient mounting sleeve to transmit vibrations from the vibrator to the structure to be vibrated, while at the same time eliminating metal to metal contact and providing a cushion between the vibrator mounting bracket and the structure to be vibrated, eliminating rebounding between the mounting arrangement and the structure to be vibrated, and substantially reducing the level of noise generated during operation of the vibrator.

SUMMARY OF THE INVENTION

The present invention provides a mounting arrangement for removably mounting a vibrator to a structure to be vibrated, such as a railroad car. The mounting arrangement includes a generally wedge-shaped mounting sleeve formed from a resilient cushioning material such as a thermoset polyester urethane material. The mounting sleeve includes a front surface having a top end and a bottom end, and a rear surface having a top end and bottom end which is spaced apart from and opposing the front surface. The sleeve includes a front face and a spaced apart rear face. The front surface is located on the front face and the rear surface is located on the rear face. A gap or a pocket is located between the front and rear faces. The mounting sleeve includes a top surface extending between the top end of the front surface and the top end of the rear surface and an aperture in communication with the gap. A slot extends through the rear face between the rear surface and the gap. The slot also extends from the aperture in the top surface to an end wall located between the top end of the rear surface and the bottom end of the rear surface.

The mounting arrangement also includes a bracket having a flange designed so as to be positioned within the pocket of the sleeve and a web extending from the flange through the slot in the rear face of the sleeve. The web is adapted to be attached to the vibrator. The mounting sleeve is adapted to be inserted into a complementary shaped female receptacle which is permanently mounted on the structure to be vibrated such that the mounting sleeve insulates and cushions the bracket from direct contact with the structure to be vibrated, eliminates rebounding, and reduces the level of noise generated during operation of the vibrator, while the mounting sleeve effectively transmits vibrations produced by the vibrator from the bracket to the structure to be vibrated.

BRIEF DESCRIPTION OF THE DRAWINGS

FIG. 3 is a top plan view of the mounting arrangement.

FIG. 4 is a side elevational view of the mounting arrangement.

FIG. 5 is a top plan view of the mounting sleeve.

FIG. 6 is a rear elevational view of the mounting sleeve.

FIG. 7 is a front elevational view of the mounting sleeve.

DETAILED DESCRIPTION OF THE PREFERRED EMBODIMENT

Figure 1:
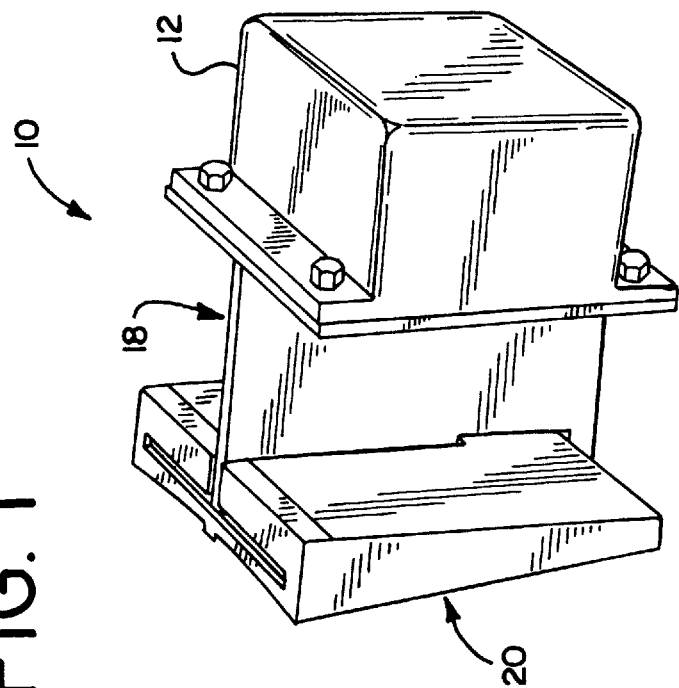
FIG. 1 is a perspective view of the mounting arrangement of the present invention shown attached to a vibrator.
Figure 8:
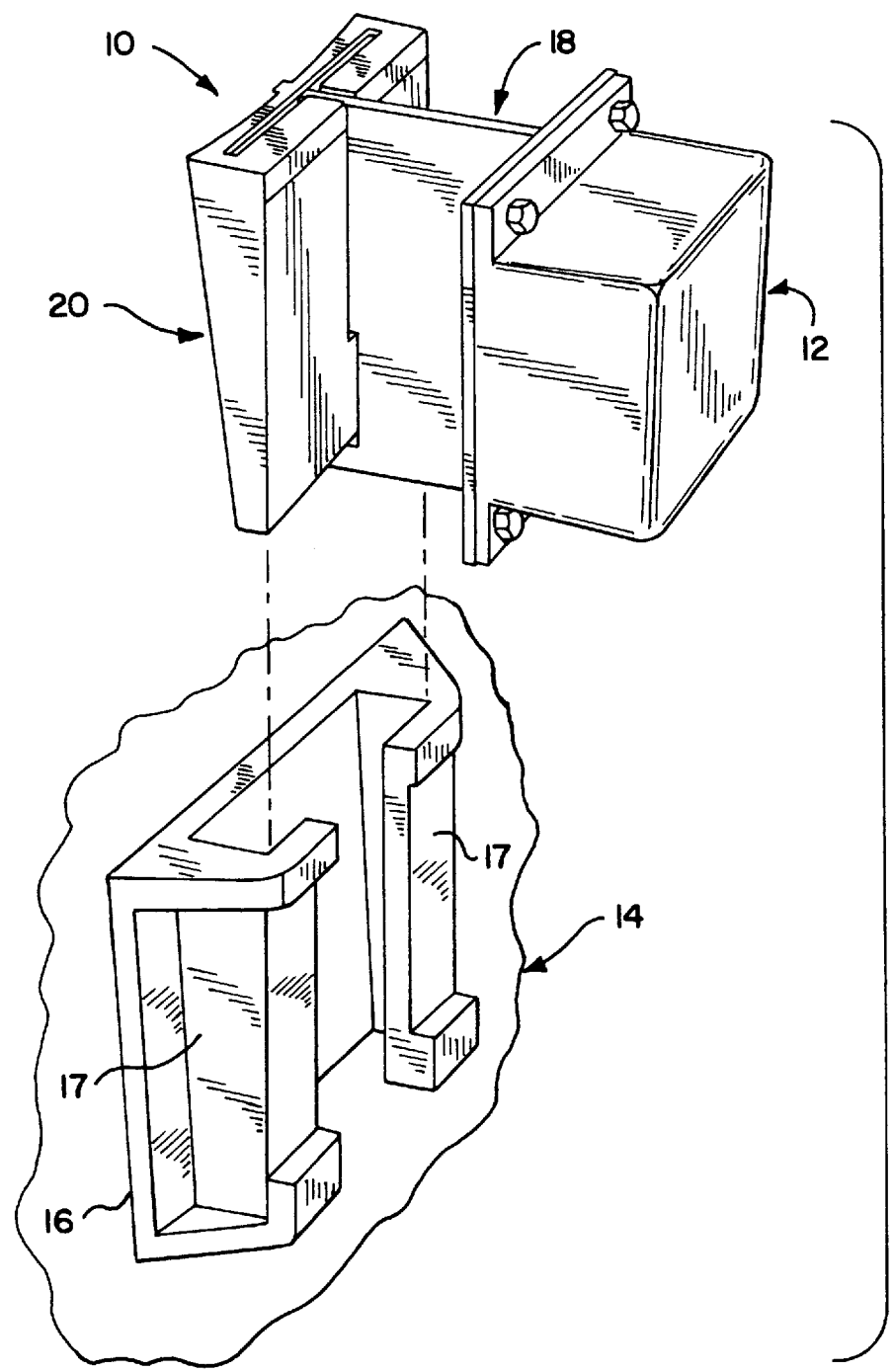
FIG. 8 is an exploded perspective view of the mounting arrangement and vibrator shown adapted to be mounted to a structure to be vibrated including a receptacle.

A preferred embodiment of the mounting arrangement 10 of the present invention is shown in FIG. 1 attached to a vibrator 12. The mounting arrangement 10 is adapted to removably mount the vibrator 12 to a structure 14, such as a railroad car, bin, silo or other storage structure, which is to be vibrated. The vibrator 12 vibrates the structure 14 through the mounting arrangement 10 to assist in the unloading of bulk material contained within the structure. The vibrator 12 is preferably a linear non-impacting vibrator, such as Model No. NTS 50/04 manufactured by Netter GmbH and of the type illustrated in U.S. Pat. Nos. 4,526,049, 4,974,494, 4,996,907 and 5,095,809 which are incorporated herein by reference.

The mounting arrangement 10 includes a mounting bracket 18 and a mounting cushion or sleeve 20. The mounting bracket 18 includes a generally planar flange 22 having a top end 24, a bottom end 26, a first side edge 28, and a second side edge 30. The flange 22 includes an outer surface 32 and an opposing inner surface 34. The bracket 18 also includes a web 38 which is attached perpendicularly to the flange 22, such that the flange 22 and web 38 form a generally T-shaped structure as shown in FIG. 3. The web 38 is generally planar and includes a top end 40, a bottom end 42, a first side edge 44 and a second side edge 46. The flange 22 is attached to the second side edge 46 of the web 38. The top end 24 of the flange 22 is located adjacent the top end 40 of the web 38. The bottom end 26 of the flange 22 is preferably located between the top end 40 and bottom end 42 of the web 38.

A notch 48 is formed in the web 38 at the second edge 46 and is located between the bottom end 26 of the flange 22 and the bottom end 42 of the web 38. The web 38 includes a projection 50 at the bottom end 42, such that the notch 48 is located between the bottom end 26 of the flange 22 and the projection 50. The notch 48 is formed by a top edge 52 located at the bottom end 26 of the flange 22, a spaced apart bottom edge 54 which forms a part of the projection 50, and a side edge 56 which extends between the top edge 52 and the bottom edge 54. The side edge 56 is inclined at an angle to the flange 22.

A mounting plate 60 is attached to the first side edge 44 of the web 38 and is generally perpendicular thereto. The bracket 18 is generally I-shaped as shown in FIG. 3. The mounting plate 60 includes a plurality of apertures to facilitate attachment of the vibrator 12 to the mounting bracket 18. The mounting bracket 18 is preferably formed from steel, although other types of metals, and other types of rigid materials, may be used as desired.

Figure 2:
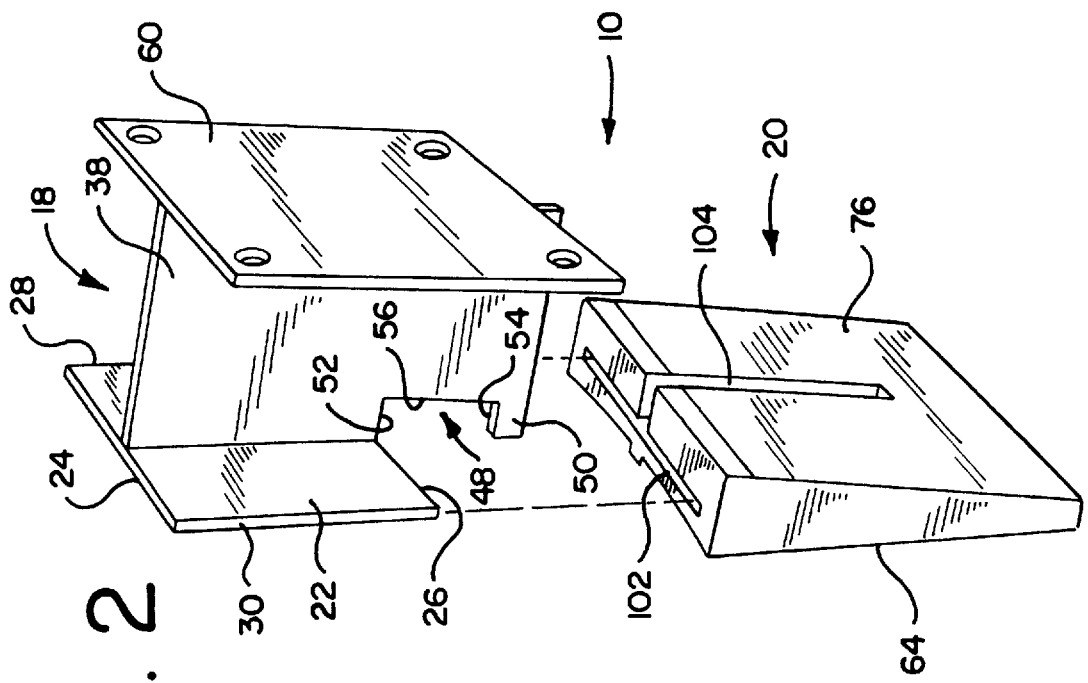
FIG. 2 is an exploded view of the mounting arrangement.

The mounting sleeve 20 includes a front surface 64 having a top edge 66, a spaced apart bottom edge 68, a first side edge 70 and a spaced apart second side edge 72. The front surface 64 is preferably concavely curved in an arc such that the top edge 66 and bottom edge 68 are curved while the first and second side edges 70 and 72 are substantially rectilinear. The purpose of the curved front surface 64 is to assist in removal of the sleeve 20 from the mounting receptacle mounted on the surface of the object to be vibrated. Alternatively, the front surface may be generally planar. The sleeve 20 also includes a rear surface 76 having a top edge 78, a bottom edge 80, a first side edge 82 and a second side edge 84. The rear surface 76 is preferably substantially planar. The rear surface 76 is inclined at an angle to the front surface 64 such that the sleeve 20 is generally wedge-shaped, having a relatively narrow tip at its bottom end and a relatively wide top end as shown in FIG. 2. The front surface 64 preferably extends generally vertically such that it is generally parallel to the flange 22, while the rear surface 76 is inclined at an angle to the flange 22. The sleeve 20 includes a bottom surface 88 which extends between the bottom edge 80 of the rear surface 76 and the bottom edge 68 of the front surface 64. A top surface 90 extends between the top edge 78 of the rear surface 76 and the top edge 66 of the front surface 64.

The sleeve 20 includes a front face 94 and a rear face 96. The rear face 96 opposes the front face 94 and is spaced apart from the front face 94 by a gap or pocket 98. The pocket 98 is sized to receive the flange 22 of the bracket 18. The front surface 64 is located on the front face 94 and the rear surface 76 is located on the rear face 96. The front face 94 is adapted to be located adjacent to the outer surface 32 of the flange 22 and the rear face 96 of the sleeve 20 is adapted to be located adjacent the inner surface 34 of the flange 22. The pocket 98 includes a bottom wall 100 shown in FIG. 6 which extends between the front face 94 and the rear face 96. The top surface 90 includes a slot 102 which is in communication with the pocket 98. The sleeve 20 also includes a generally rectangular slot 104 which extends through the rear face 96 from the rear surface 76 to the pocket 98 and which extends from the slot 102 in the top surface 90 to the bottom wall 100. The slot 104 is adapted to receive the web 38 of the bracket 18. As best shown in FIG. 5, the thickness of the rear face 96 between the rear surface 76 and the pocket 98 is greater than the thickness of the front face 94 between the front surface 64 and the pocket 98.

The front surface 64 preferably includes a rib 106 which projects outwardly as shown best in FIG. 5. The rib 106 extends generally linearly between the top edge 66 and the bottom edge 68 of the front surface 64 and is generally centrally located between the first side edge 70 and second side edge 72. The rib 106 projects outwardly from the front surface 64 to a front edge 108. The front edge 108 of the rib 106 is preferably located approximately coplanar with the first and second side edges 70 and 72 of the front surface 64.

The mounting sleeve 20 acts as a cushion between the bracket 18 and the structure to be vibrated. As used herein the term cushion includes anything that dampens shocks or prevents chafing or rattling; anything used to counteract shocks, jars or jolts, or to check the motion of the vibrator mounting arrangement or quiet its operation. The cushion may be formed from materials such as cloth, leather, wood, rubber or elastomers such as urethane. The cushion or sleeve 20 is preferably formed from a nonmetallic and resilient dead blow cushioning material, such as a premium thermoset polyester urethane compound as used in dead blow hammers. The sleeve 20 preferably has a hardness of approximately 96 Shore A. This type of dead blow urethane compound is less prone to hysteresis and transmits vibration more efficiently than the more common polyether/ester urethane compounds. Elastomers typically tend to rebound or bounce after being struck against a hard body. The dead blow cushioning material provides a low or zero rebound characteristic, such that it does not tend to bounce when struck against a hard body. The dead blow urethane elastomer is deadened by the inclusion of fillers which minimize the typical characteristic of elastomers to rebound after deformation. This type of dead blow urethane compound effectively prevents rebounding of the mounting arrangement 10 during operation of the vibrator 2. The cushion or sleeve 20 may also be formed from rubbers that are oil filled to provide zero or low rebound characteristics. The cushion or sleeve 20 may also be formed from other materials which provide similar cushioning characteristics, and rebounding and sound suppressing or abating characteristics, while effectively transmitting vibrations.

While the preferred embodiment of the sleeve 20 is shown herein as being integrally molded in a single piece, the sleeve 20 may alternatively be formed in two or more separate pieces. For example, the front face 94 may be formed separately from the rear face 96. In this case, the front face 94 would be attached to the outer surface 32 of the flange 22 by an adhesive or other fastening mechanism and the rear face 96 would similarly be attached to the inner surface 34 of the flange 22. In addition, the rear face 96 could be formed in two sections, with one section being attached to the inner surface 34 of the flange 22 at one side of the web 38 and the other section of the rear face 96 being attached to the inner surface 34 of the flange 22 on the other side of the web 38.

In operation, the bottom end 26 of the flange 22 and the top edge 52 of the notch 48 in the web 38 are respectively inserted in to the pocket 98 and slot 104 of the sleeve 20 through the slot 102 in the top surface 90 of the sleeve 20. The bracket 18 is inserted into the pocket 98 and slot 104 until the bottom end 26 of the flange 22 engages the bottom wall 100 of the sleeve 20. The bottom tip end of the sleeve 20 fits within the notch 48 such that the projection 50 will engage the bottom surface 88 at the bottom end of the sleeve 20 to prevent unintended removal of the sleeve 20 from the bracket 18. However, the tip at the bottom end of the sleeve 20 may be resiliently bent outwardly away from the notch 48 to clear the projection 50 and thereby allow sliding removal of the sleeve 20 from the bracket 18 when desired, such as if the sleeve 20 should become damaged and require replacement or if a different size sleeve is required.

The vibrator 12 is attached to the mounting plate 60 by nuts and bolts or other types of fasteners. The tip of the sleeve 20 is then inserted into a complementary shaped receptacle 16 or holder on the structure 14 to be vibrated which typically includes two opposing and spaced apart generally L-shaped ears 17 which wrap around opposite sides of the sleeve 20 to engage the rear face 96 at each side of the web 38. The sleeve 20 is inserted downwardly into the receptacle 16 until the rear face 96 and the front face 94 are securely wedged within the receptacle 16. The vibrator 12 may then be activated. Vibrations from the vibrator 12 will be transferred to the bracket 18 and the sleeve 20 will transfer the vibrations from the bracket 18 to the structure 14. The mounting sleeve 20 insulates and cushions the bracket 18 from direct contact with the receptacle 16 or structure 14 to prevent metal on metal contact and prevents rebounding or rattling of the mounting arrangement 10 within the receptacle 16. The sleeve 20 thereby reduces the high level of noise that is typically generated during operation of a vibrator which is attached to the structure 14 by a metal on metal connection and results in a working environment with greater auditory safety. The elimination of the rebounding of the mounting arrangement 10 also results in a more efficient transfer of vibrational energy from the vibrator 12 to the structure to be vibrated.

The mounting arrangement 10 and vibrator 12 can be removed from the receptacle 16 more easily than with prior art arrangements by lifting upwardly on the bracket 18 to slide the sleeve 20 out of the receptacle 16. A handle (not shown) such as a rubber coated cable may be attached to the bracket 18 to facilitate insertion and removal. The projection 50 engages the bottom end of the sleeve 20 during removal of the mounting arrangement 10 from the receptacle 16 to prevent the flange 22 from sliding out of the sleeve 20. The rib 106 on the sleeve limits the amount of surface area contact between the front surface 64 and the structure 14 to make removal of the sleeve 20 from the receptacle 16 easier than if the entire front surface 64 of the sleeve 20 engaged the structure 14. The resiliency and cushioning properties of the mounting sleeve 20 enable the mounting arrangement 10 to be securely attached to the structure such that the mounting arrangement 10 will not vibrate loose from the structure and will maintain contact with the structure 14 during operation of the vibrator 12 to eliminate rebounding, while allowing the mounting arrangement 10 to be selectively and easily removed from the structure 14 when desired.

The mounting arrangement 10 weighs approximately eight pounds when the bracket 18 is formed from steel and is substantially lighter in weight than prior mounting brackets. Additional weight savings can be obtained by forming the bracket 18 from lighter weight metals if desired.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A mounting arrangement for removably mounting a vibrator attached to a mounting bracket to a structure to be vibrated, the structure to be vibrated having a receptacle secured thereto for receiving said mounting arrangement, said mounting arrangement including:

A non-metallic cushion member adapted to be disposed between the mounting bracket and the receptacle, said cushion member adapted to substantially insulate the mounting bracket from direct contact with the receptacle and the structure to be vibrated;

said cushion member having a substantially C-shaped portion including a slot opening and providing a first face adapted to be associated with a first surface of the mounting bracket and a second face adapted to be associated with a second surface of the mounting bracket;

whereby said cushion member is adapted to substantially insulate the mounting bracket of the vibrator from direct contact with the receptacle and the structure to be vibrated to reduce noise levels during operation of the vibrator, but said cushion member is effective to transmit vibrations from the vibrator to the structure.

2. The mounting arrangement of claim 1 wherein said cushion member is formed from a resilient material.

3. The mounting arrangement of claim 1 wherein said cushion member is formed from an elastomeric material.

4. The mounting arrangement of claim 1 wherein said cushion member comprises a mounting sleeve that is adapted to be removably inserted in the receptacle of the structure to be vibrated.

5. The mounting arrangement of claim 4 wherein said mounting sleeve is formed from a resilient material.

6. The mounting arrangement of claim 4 wherein said mounting sleeve includes a front surface having a top end and a bottom end, and a rear surface having a top end and a bottom end, said front surface being located on said first face and said rear surface being located on said second face.

7. The mounting arrangement of claim 6 wherein said rear surface is disposed at an inclined angle to said front surface such that said mounting sleeve is generally wedge-shaped.

8. The mounting arrangement of claim 6 including a gap located between said first face and said second face, said gap adapted to receive the bracket.

9. The mounting arrangement of claim 8 wherein said mounting sleeve includes a top surface extending between said top end of said front surface and said top end of said rear surface, said top surface including an aperture in communication with said gap.

10. The mounting arrangement of claim 9 wherein said slot opening extends through said first face between said rear surface of said second face and said gap, said slot opening adapted to receive the mounting bracket.

11. The mounting arrangement of claim 10 wherein said slot opening extends from said aperture in said top surface to an end wall located between said top end and said bottom end of said rear surface.

12. The mounting arrangement of claim 9 wherein said gap forms a pocket extending between said aperture in said top surface and a bottom wall extending between said second face and said first face.

13. The mounting arrangement of claim 6 wherein said front surface is generally concavely curved.

14. The mounting arrangement of claim 13 wherein said front surface includes an outwardly projecting rib adapted to aid in removal of said mounting sleeve from the receptacle.

15. The mounting arrangement of claim 14 wherein said rib extends generally linearly between said top end and said bottom end of said front surface.

16. The mounting arrangement of claim 1 wherein said second face is thicker than said first face.

17. A mounting arrangement for removably mounting a vibrator to a structure to be vibrated, the structure to be vibrated having a receptacle secured thereto for receiving said mounting arrangement, said mounting arrangement including:

- a bracket adapted to be attached to the vibrator, said bracket including a first surface and a second surface; and
- a non-metallic cushioning member adapted to be connected to said bracket for substantially insulating said bracket from direct contact with the receptacle and the structure to be vibrated, said non-metallic cushioning member including
- a substantially C-shaped cross-sectional portion having a front face adapted to be associated with said first surface of said bracket, and a rear face adapted to be associated with said second surface of said bracket,
- whereby said non-metallic cushioning member is adapted to be coupled to the structure to be vibrated such that said non-metallic cushioning member substantially insulates said bracket from direct contact with the receptacle and the structure to be vibrated to reduce noise levels during operation of the vibrator, while said non-metallic cushioning member effectively transmits vibrations from said bracket to the structure to be vibrated.

18. The mounting arrangement of claim 17 wherein said non-metallic cushioning member is formed from a resilient material.

19. The mounting arrangement of claim 17 wherein said non-metallic cushioning member is formed from an elastomeric material.

20. The mounting arrangement of claim 17 wherein said non-metallic cushioning member comprises a mounting sleeve.

21. The mounting arrangement of claim 20 wherein said mounting sleeve is formed from a resilient material.

22. The mounting arrangement of claim 20 wherein said mounting sleeve includes a gap located between said rear face and said front face, said gap adapted to receive said bracket.

23. The mounting arrangement of claim 22 wherein said bracket includes a flange located in said gap and a web extending from said flange, said web being adapted to be attached to the vibrator.

24. The mounting arrangement of claim 22 wherein said rear face includes a slot extending therethrough in communication with said gap, said slot adapted to receive said bracket.

25. The mounting arrangement of claim 24 wherein said slot extends from a top end of said rear face.

26. The mounting arrangement of claim 20 wherein said sleeve includes a front surface located on said front face, and a rear surface located on said rear face.

27. The mounting arrangement of claim 26 wherein said rear surface extends at an inclined angle to said front surface such that said mounting sleeve is generally wedge-shaped.

28. The mounting arrangement of claim 23 wherein said web includes a projection adapted to engage a bottom end of said mounting sleeve, said projection being adapted to retain said flange within said gap during removal of said mounting arrangement from the structure to be vibrated while allowing selective removal of said mounting sleeve from said bracket.

29. The mounting arrangement for removably mounting a vibrator and a mounting bracket to a structure to be vibrated, said mounting arrangement including:

- a mounting sleeve formed from a resilient dead blow cushion material that has a low or zero rebound characteristic;
- said sleeve having a front face;
- said sleeve having a rear face spaced apart from and opposing said front face; and
- a pocket formed within said sleeve between said front face and said rear face, said pocket adapted to receive the mounting bracket;
- whereby said mounting sleeve is adapted to insulate the mounting bracket of the vibrator from direct contact with the structure to be vibrated to reduce noise levels during operation of the vibrator, but said mounting sleeve is effective to transmit vibrations from the vibrator to the structure.

30. The mounting arrangement of claim 29 wherein said resilient dead blow material comprises a polyester urethane material.

* * * * *